Figure 1:
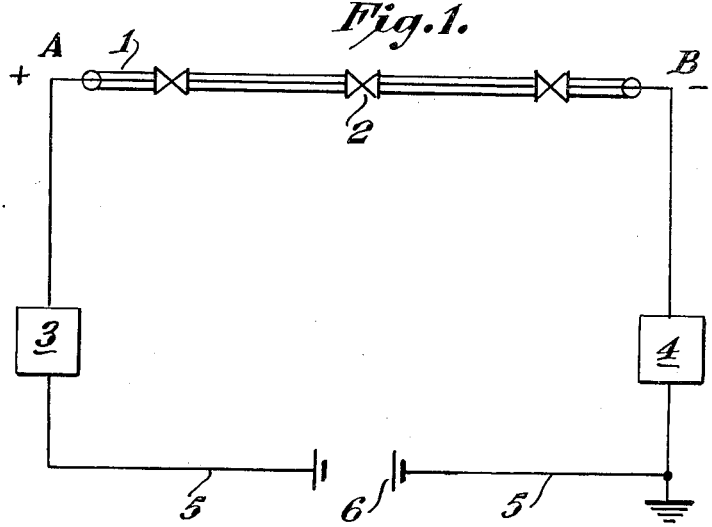

May 22, 1962 K. E. LATIMER 3,036,220
POWER SUPPLY EQUIPMENT FOR SUBMARINE CABLES
Filed June 1, 1959

INVENTOR
Kenneth Eric Latimer
BY Baldwin & Wight
ATTORNEYS

United States Patent Office 3,036,220
Patented May 22, 1962

3,036,220
POWER SUPPLY EQUIPMENT FOR SUBMARINE CABLES
Kenneth Eric Latimer, Golders Green, London, England, assignor to Submarine Cables Limited, London, England, a British corporation
Filed June 1, 1959, Ser. No. 817,232
Claims priority, application Great Britain June 5, 1958
5 Claims. (Cl. 307—58)

This invention relates to power supply equipment and a method for feeding a constant direct current to a submarine cable for the purpose of energising submerged repeaters. More particularly it is concerned with the operation of power supply units in series at one or both ends of the cable.

Difficulties are expected to a rise in known D.C. power feed systems for long submarine cables situated near the Arctic and Antarctic circles (more precisely, near the so-called "auroral belts" where the maximum current flow in the ionosphere occurs and where the greatest disturbances of earth voltage due to magnetic storms are also experienced.)

These differences in earth voltage can be comparable with but somewhat smaller than the voltage required for power feed purposes. Under these circumstances the voltage required for the operation of the system becomes very variable and, as will be shown later, the greatest danger to the submerged equipment exists when the supply voltage happens to be low and not when it happens to be high.

An examination of the characteristics of known D.C. power feed systems indicates that the effects of magnetic storms have not been considered in full and systems of improved performance are required in the following aspects:

(a) The terminal station entrusted with the supervision of the system must be able to observe all the voltage variations (positive or negative) due to magnetic storms whereas the voltage at the far end must be held constant over a small range of current. The latter requirement is at present only partially fulfilled.

(b) When the power unit fails at either end of the cable the voltage of the remaining unit or units in series with it must increase so that the total voltage supplied by that station remains unchanged, i.e., the failure of a unit must be compensated for by another unit in the same station.

(c) In the event of the complete failure of power supply at one terminal station, the other station must take over the entire load.

(d) It must be possible to know when a power supply unit has failed, even if its normal supply voltage may be varying over a very wide range.

(e) The mechanism which provides the solution to the above problems, must not itself introduce any additional hazards.

According to the invention direct current power supply equipment for submarine cables comprises a plurality of series-connected primary constant current generators or direct current sources such as controlled rectifiers and one or more auxiliary constant current generators, wherein each of said auxiliary constant current generators is associated with one or more of said primary generators and is effective to stabilise the operating voltage of its associated primary generator or generators.

Preferably each of the auxiliary generators is adjusted to have an accurately predetermined maximum voltage limit which is independent of power mains variation.

In a preferred embodiment of the invention an auxiliary generator is associated with and connected in parallel with each of the primary generators and an auxiliary generator is connected in parallel across the plurality of series-connected primary generators.

In the power supply equipment of the present invention the auxiliary generators are arranged in such manner that they feed current into the main power feed path only when the voltage between the points at which they are connected falls below a predetermined critical voltage.

If desired each of said auxiliary generators may be provided with alarm means, said alarm means being operable when its associated auxiliary generator is operating below its predetermined critical voltage.

Further features of the invention will become apparent in the course of the following description.

It is proposed to refer to the auxiliary power units by the name of "not-less-than" circuits, since that describes their function, namely to ensure that the voltage of the main power unit or group or units with which they are associated fulfills the following requirements:

(a) Over a small range of current the voltage has some accurately predetermined value.

(b) For a current slightly less than the current range mentioned in (a), the voltage may be higher by any arbitrary amount. Under these circumstances the auxiliary circuit gives no alarm, as this is a normal occurrence. (Separate precautions are taken to ensure that an excessive voltage is not applied to the cable.)

(c) For a current slightly more than the range mentioned in (a) the voltage will be less than the predetermined value. An alarm is given under these circumstances.

(d) If the main unit fails to deliver a voltage at least equal to the critical value, an alarm is given.

Figure 2:
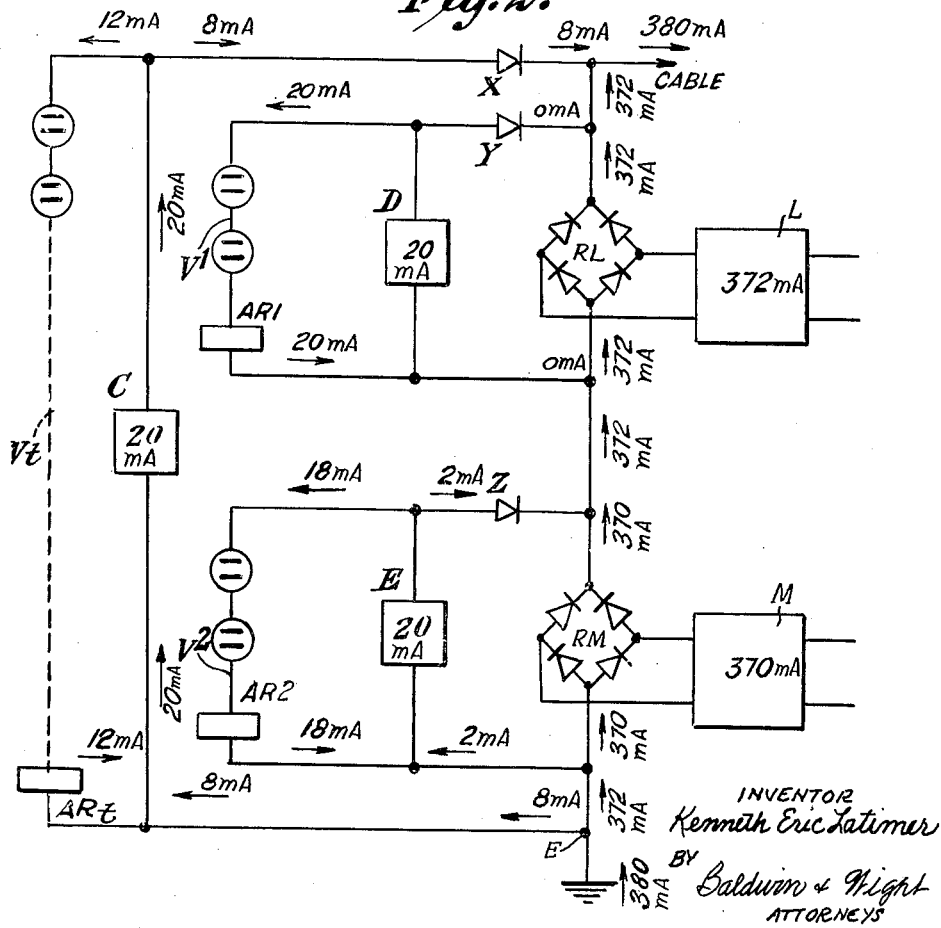

The invention will now be described, by way of example, with reference to the accompanying drawings, in which:

FIGURE 1 is a circuit diagram of an orthodox earth-return submarine cable installation provided with repeaters and a double-end power feed system for those repeaters; and FIGURE 2 is a circuit diagram of direct current power supply equipment for an installation as shown in FIGURE 1 but according to the present invention.

In FIGURE 1 a submarine cable 1 containing submerged repeaters 2 is to be supplied with power at terminal stations A and B. At A there is a constant current power supply 3 which supplies a positive voltage to the submarine cable with respect to local earth. At end B there is a similar power supply 4 which provides a negative voltage with respect to local earth. The earth connections must not be considered as being at the same potential but can be represented by a wire 5 in which a source of potential 6 (shown as a battery) is introduced. It is to be understood that the origin of the sources of potential is geomagnetic in character, comparable with but smaller than the total feed voltage required for the cable and capable of changing its polarity at fairly long intervals.

Suppose that the total feed voltage required is for example 2000 v. and the voltage of 6 is ±1000 v.; suppose that the voltage at end B is kept constant at 1000 v. where-that at end A (supervising station) is allowed to vary so as to keep the current flowing through the cable at its specified value. Under the circumstances mentioned, i.e., 4 and 6 are each of 1000 v., it will be apparent that A will be required to produce no voltage at all. This is a dangerous condition since an accidental open circuit in the system would result in the supply voltage A rising from zero to 2000 v. which would be added to the earth voltage so that the total voltage appearing between the break and earth would, in this example be 3000 v. It is thus valuable to know when the voltage at the A end falls to a low value since this may necessitate a decision to shut down the system. If the polarity of 6 reverses itself A will have to supply 2000 v. in order to maintain the current. It will be noted that this is evidently the most desirable distribution of voltages between the ends of the cable, because A will then vary over the useful portion of its characteristic (it must be capable of supplying 2000 v. for single-end power feed and it could hardly produce a negative voltage). If the voltage of B is allowed to vary at random there will be even wider variations of voltage at A.

It will be quite obvious from the above that this leads to some rather complicated requirements with regard to alarm circuits, and in respect of the procedure to be adopted if each station includes two or more power feeding units in series, one of which may possibly fail.

Referring now to FIGURE 2, this shows power supply equipment indicated generally by 4 in FIGURE 1 and located at the supervised station end B of the cable.

The power supply equipment includes series connected power supply units L and M intended each to supply a constant current of 370 m.a. but in fact supplying, owing to manufacturing tolerances, 372 m.a. and 370 m.a. respectively. The output from supply unit L is connected across opposite corners of a single phase, full wave, bridge-type rectifier RL, and the output from supply unit M is connected across opposite corners of a single phase, full wave, bridge-type rectifier RM. The series circuit is formed by connections between earth E and one output corners of rectifier RM, between output corners of rectifiers RM and RL, and the second output corner of rectifier RL and the cable.

An auxiliary constant current generator C giving an output of 20 m.a. has one output terminal connected to the earth E and the other output terminal connected through a rectifier X to the cable. A voltage stabilizing device V$t$ consisting of a series of neon tubes is connected across the output of the generator C and is adapted to shunt that generator to a variable extent to maintain its output voltage substantially constant at a voltage V$t$ equal to that which it is desired to maintain between earth and cable. An automatic alarm AR$t$ has its operating coil arranged to carry the current through the device V$t$.

The combination of auxiliary current generator C, rectifier X and stabilizing device V$t$ forms a stabilizing circuit connected between earth and cable. Two similar stabilizing circuits are connected respectively across the output from the rectifier RL and the output from the rectifier RM. Thus a constant current generator D giving an output of 20 m.a. is connected directly to one output corner of the rectifier RL and through a rectifier Y to the second output corner of the rectifier RL, a voltage stabilizing device V1 being connected across the generator D and an automatic alarm device AR1 having its operating coil arranged to carry the current through device V1. In a similar manner, a constant current generator E giving an output of 20 m.a. is connected directly to one output corner of the rectifier RM and through a rectifier Z to the second output corner of the rectifier RM, a voltage stabilizing device V2 being connected across the generator E and an automatic alarm device AR2 having its operating coil arranged to carry the current through device V2.

The stabilized voltages of the devices V1 and V2 are equal and are thus each equal to or less than half of the stabilized voltage V$t$, although the voltages of V1 and V2 may be selected otherwise as long as their sum equals or is less than V$t$.

The equipment shown in FIGURE 2 is intended to hold the cable to earth voltage at the cable end A constant at the voltage V$t$ over a small range of current variation, for example over the range 370 to 390 m.a.; for a current slightly in excess of 390 m.a. the voltage will fall to zero, and for a current slightly below 370 m.a. the voltage would rise to the maximum permitted by the design of the equipment.

On FIGURE 2 are indicated the currents which will flow in the various components when the load current in the cable is 380 m.a. Of the 20 m.a. output from auxiliary generator C, 12 m.a. will be shunted through the voltage stabilizing device V$t$ and 8 m.a. will flow through the rectifier X to the cable. The whole of the 20 m.a. output from auxiliary generator D will be shunted through the voltage stabilizing device V1. Of the 20 m.a. output from auxiliary generator E, 18 m.a. will be shunted through the voltage stabilizing device V2 and 2 m.a. will flow through the rectifier Z to the cable.

It will be seen that if the units L and M together supply a voltage greater than V$t$ the rectifier X will become non-conducting, and the whole of the output of C will flow into the neons of the stabilizing device V$t$. But if the load tends to rise above 380 m.a. the voltages of L and M will both fall until the rectifier X conducts once more. Hence the total voltage supplied by units L and M will be accurately stabilized at V$t$.

Of the two auxiliary generators D and E, only one will in general be operative, namely that connected across the unit which is stabilised at the lower current, in this case M. The current supplied by E into the main power feed circuit will be the difference between the settings of L and M, in this case 2 m.a. The reason will be similar to that stated above, namely that if the voltage of M exceeds V2 the rectifier Z will become non-conducting and the current through M will rise to 372 m.a. Under these circumstances the voltage of M will drop until Z conducts once more.

The voltage of L will exceed V1 since V$t$ is greater than $V1+V2$ and the combined voltages of the two power units must be V$t$.

Suppose that the power unit L fails and its voltage drops to zero. Its output rectifier will continue to conduct the feed current which will fall from 372 m.a. to 350 m.a., an additional 20 m.a. flowing through unit D and rectifier Y. Unit D will thus be operating under short circuit conditions.

The current through unit M will remain at 370 m.a. but rectifier Z will become non-conducting. The voltage of M will rise to V$t$ and current through rectifier X will increase to 10 m.a.

The requirement stated in (b) above is thus fulfilled, i.e. the failure of unit L is compensated for, by increase in the voltage of unit M, so total voltage applied to the cable remains unchanged at V$t$.

Because the voltage of unit D is reduced to zero the neon lamps which stabilise the voltage V1 will be extinguished and the current passing through the alarm relay AR1 will fall to zero. This gives an indication that unit L has failed.

It will be noticed that if any one of the auxiliary units C, D, or E fails the performance of the system will be practically unaltered. Thus if unit C fails the voltage applied to the cable will fall slightly from V$t$ to $V1+V2$ which is only slightly less than V$t$.

If unit D fails there will be no change whatever because it is not operative, whereas if unit E fails the voltage of unit M will decrease and that of L will increase, thus maintaining voltage V$t$ constant.

This fulfills the requirements of (e) above.

If the power unit at the far end A fails the current in the cable will drop from 380 m.a., first to 372 m.a., at which point the rectifier X will become non-conducting and the voltage at unit L will start to increase. When it has increased to the maximum of which it is capable, the current will fall to 370 m.a., whereupon rectifier Z will also become non-conducting. The voltage of M will then also start to increase until finally the voltage across the cable is built up to the value such that single end power feed has been established. This fulfills the requirements of (c) above.

The only difference between supervising and supervised stations, A and B respectively, is that in the case of the former, the voltages V1 and V2 would have very small values and the unit C would be omitted, unless it is used for alarm purposes only to indicate the presence of a magnetic storm. Under these conditions one or two units L or M will operate at a low value V1 or V2 whereas the other will supply nearly all the necessary voltage for the operation of the system, otherwise the equipment operates in very much the same way as for the supervised station B. It will also be obvious that the power units L, M, D or E may fail without causing an appreciable change in the system at all, i.e., one of the units L or M will take over the supply from the other and an alarm will be given.

It will be seen that one of the advantages of the invention is thus to ensure that the voltage at the supervised station B remains accurately fixed over a small range of currents, although the equipment at this station consists of a plurality of power feed units in series any one of which may fail.

A further advantage of the equipment described is that it indicates whether any of the units which together constitute the equipment has failed even though the entire equipment may on certain occasions be providing only a very small voltage. Further, if the power supplies at one end of the cable fail completely additional voltage becomes available at the opposite end to continue the supply on a single-end feed basis. Finally, if the cable develops an earth fault at any point, the current supplied by each end of the cable must still remain at a value reasonably close to the specified current.

What is claimed is:

1. A direct current power supply equipment for the repeaters of a submarine cable which comprises a first primary constant current controlled rectifier, at least one additional primary constant current controlled rectifier connected in series with the first controlled rectifier to form a main power feed path, an auxiliary constant current controlled rectifier connected in parallel with at least one of the primary controlled rectifiers by connection between two points of the main power feed path, and means adapted to regulate the flow of current from the auxiliary controlled rectifier to the main power feed path to increase that current when the voltage between the two points falls below a predetermined critical value, whereby the operating voltage of the primary controlled rectifier connected in parallel with the auxiliary controlled rectifier is stabilized.

2. A direct current power supply equipment as claimed in claim 1, in which the auxiliary controlled rectifier is adjusted to have an accurately predetermined maximum output voltage which is independent of voltage variations in the main power feed path.

3. A direct current power supply equipment as claimed in claim 2, in which there is an auxiliary controlled rectifier associated with and connected in parallel with each primary controlled rectifier and in which an auxiliary controlled rectifier is connected in parallel with and across the plurality of series-connected primary controlled rectifiers.

4. A direct current power supply equipment as claimed in claim 3, in which each of said auxiliary controlled rectifiers is provided with an alarm means, which operates when the output voltage of the associated auxiliary controlled rectifier falls below a predetermined critical voltage.

5. A direct current power supply equipment arranged to supply power for the repeaters of a submarine cable and arranged to operate with an earth-return circuit, which comprises a first primary constant current controlled rectifier, at least one additional primary constant current controlled rectifier connected in series with the first controlled rectifier to form a main power feed path, an auxiliary constant current controlled rectifier connected in parallel with at least one of the primary controlled rectifiers by connection between two points of the main power feed path, and means adapted to regulate the flow of current from the auxiliary controlled rectifier to the main power feed path to increase that current when the voltage between the two points falls below a predetermined critical value, whereby the operating voltage of the primary controlled rectifier connected in parallel with the auxiliary controlled rectifier is stabilized.

References Cited in the file of this patent

UNITED STATES PATENTS

| | | |
|---|---|---|
| 2,208,183 | Alexanderson | July 16, 1940 |
| 2,572,210 | Spencer | Oct. 23, 1951 |
| 2,594,019 | Holman | Apr. 22, 1952 |
| 2,778,954 | Job et al. | Jan. 22, 1957 |